Sept. 3, 1940.  S. J. KELLEY  2,213,249
INSULATION BOARD AND METHOD OF MAKING THE SAME
Filed July 28, 1934
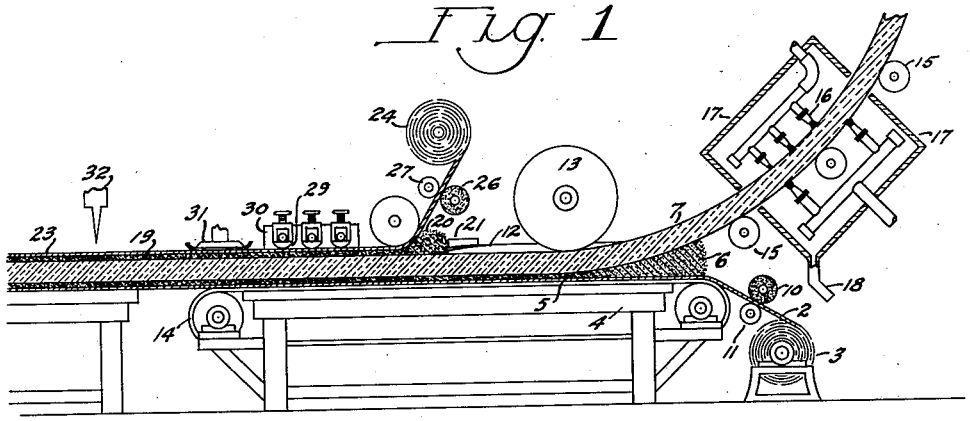
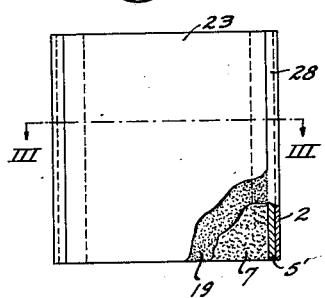
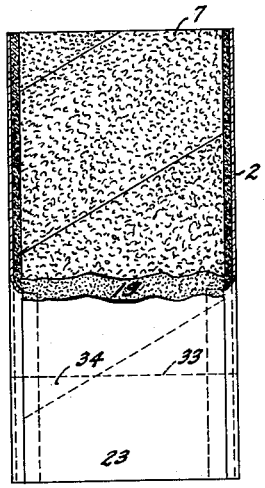
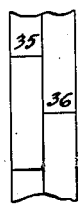
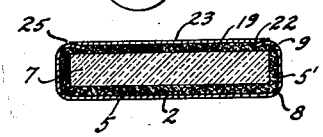
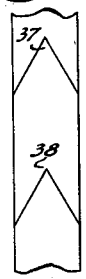
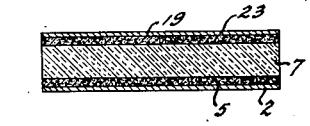
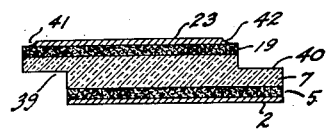
Inventor
Stephen J. Kelley
by
Walter J. Kaufman
Attorney Patented Sept. 3, 1940

2,213,249

UNITED STATES PATENT OFFICE 2,213,249

INSULATION BOARD AND METHOD OF MAKING THE SAME

Stephen J. Kelley, Passaic, N. J., assignor, by mesne assignments, of one-half to Armstrong Cork Company, Lancaster, Pa., a corporation of Pennsylvania Application July 28, 1934, Serial No. 737,331

16 Claims. (Cl. 154—8)

This application is a continuation in part of my copending application Serial No. 652,800, filed January 21, 1933 and entitled Building board.

My invention relates to an insulation board and method of making the same and more particularly to an insulation board which is structurally strong, has high resistance to bending stress, is light in weight and possesses good insulating properties, and to a method for economically and efficiently manufacturing the same.

It has been common practice in the wall board industry, and particularly in the so-called gypsum boards, to lower the weight and increase the heat insulating value by incorporating sawdust or other light woody material into the body of the board. It is obvious that the structure is not an efficient heat insulator for the insulation value of a product depends upon its ability to prevent the transmission of heat therethrough, and since the major constituent of such boards is gypsum, which is a relatively good heat conductor, and since the board is not rendered sufficiently open and porous by reason of the incorporation of the woody filler to materially affect such transmission of heat, the insulating value of such product is not great; whereas, it is well known that the fibrous insulation boards of commerce, which have an open porous structure, form highly desirable heat insulation material. This is due primarily to the relatively large proportion of void space to fibers, with the void spaces being so small as to prevent the setting up of convection currents within the board. Dead air is generally considered to be one of the best heat insulators.

The gypsum type wall board has found a definite place in the building arts due to its rigidity and strength and because of its smooth surface which permits decoration and which may be utilized as a plaster base if desired. These gypsum boards, however, have been to some extent replaced by the fibrous insulation boards because of their insulating qualities. On the other hand, fibrous insulation boards generally are deficient in that they are not structurally as strong as gypsum boards, are not smooth surfaced, are not adapted to receive the decorative treatment of gypsum boards and are not fire resistant. Furthermore, one of the major problems incident to the use of fiber boards, which is not encountered in gypsum boards, is to prevent buckling upon the absorption of moisture and, if finished, cracking upon contraction by reason of giving up moisture. It is well known that the fiber boards now on the market will absorb about 5 per cent and some as much as 35 per cent of their own volume of moisture and dimensional changes upon such absorption range as high as 2 to 3 per cent of linear expansion. It will be apparent, therefore, that the fiber boards of commerce which possess high insulating value because of their low density and high percentage of occluded air space are unsuited for many uses because of their lack of structural strength and rigidity, their roughened surface, their susceptibility to expansion upon the absorption of moisture and their lack of fire resistance.

It has been proposed to incorporate a lightweight filler in the center of gypsum boards. A filler of diatomaceous earth has been suggested Brookby Patent No. 1,428,827). The incorporation of a filler of this type does not materially increase the insulating value of the board due to the fact that gypsum flows around the diatomaceous earth and does not provide the proper pore structure, and for that reason, material of this sort has not been commercially exploited. It has also been proposed to overcome the inherent defects of fiber boards by cementing to the faces of the boards, by means of a sodium silicate cement, preformed sheets of asbestos fiber-hydraulic cement composition. This laminated product possesses a relatively high degree of resistance to deformation and structural strength but is expensive to produce and has a tendency to become loose upon contact with moisture, and permits expansion of the fiber board which it covers. There is no mechanical bond between the laminations.

It is an object of my invention to produce an insulation board which is structurally strong and rigid and possesses a high insulating value, a low specific weight and presents a smooth surface for decoration. It is a further object of my invention to provide an insulation board in which the insulating core is so sheathed and confined that expansion thereof upon the absorption of moisture is restricted and the board is rendered fire resistant. My invention further contemplates a method for economically manufacturing such insulation board by forming a strip of indefinite length and cutting to the desired board size, whereby the material may be economically manufactured by a continuous process.

Any of the well known fibrous insulation boards of commerce may be used as the core for my new board. A well known board of this type having good insulating properties is known as "Temlok" and is made of loosely associated, fibrated wood chips, preferably, the refuse pine chips from rosin extraction plants, bonded by a resin size into a low density board. This material and the process of its manufacture is disclosed in Smith, Pieper and Vogt Patent No. 1,873,056 issued August 23, 1932. The board has sufficient structural strength to permit handling in installation, and is relatively low in density, high in insulating value and presents a fibrous surface which is somewhat rough in appearance.

A typical insulation board of the fibrous type would have the following characteristics: Weight, 1.45 pounds per square foot one inch thick; conductivity of ($K_{90}$) .34 B. t. u. per hour per degree temperature change per inch of thickness; modulus of rupture of approximately 450 pounds per square inch; a deflection of .05 inch when tested in accordance with Federal specifications for fiber board which includes placing 4 x 12 inch sample on parallel supports ⅜" in radius and 8" apart with a load of 10 pounds applied at midspan through a rod ⅜" in radius for 30 seconds with a deflection at the center measured by means of a dial gauge; water absorption equivalent to 3.5% by volume of the original sample when immersed in water for 2 hours and approximately 2 per cent of linear expansion due to such water absorption. The density of the core for use in my board may be much lower than would be practicable in an ordinary fibrous insulation board without a protective sheathing.

"Temlok" is considerably more water resistant than many fibrous insulation boards due to the water resistant nature of the rosin in the chips which rosin coats the chips and serves in combination as a binder. Boards made from paper pulp, for example, and which would be suitable for use as a core in my insulation board would have considerably higher water absorption and consequently expansion would be greater.

In order to render the core fire resistant and further to prevent expansion upon the absorption of moisture, I provide a layer of hydraulic setting cementitious material to the exposed faces of the core and preferably also to the longitudinal edges, which material is set in situ on the board thereby forming a mechanical bond therewith. Due to the open fibrous character of the core, the composition which is in a plastic state flows around the intertwined surface fibers and is interlocked firmly therewith upon setting, forming a so-called mechanical bond with the fibers of the board. There is also an adhesive bond by virtue of the cementitious material adhering to the surface of the fibers. The thickness of the layer may vary considerably and may be of non-uniform thickness on the faces and/or edges. I prefer to apply a layer about 1/16" thick to the faces of the core although a highly desirable board may be produced in which one face, for example, the face to be exposed, may have a layer ⅛" thick and the inner face a layer 1/16" thick. It is desirable to apply sufficient cementitious material to build up a smooth surface on the board, but the thickness may vary within wide limits.

It has been found that the usual gypsum mix may be used to sheath the core. A typical mix of this sort is as follows:

| | Parts by weight |
|---|---|
| Gypsum | 100 |
| Water | 65 |

Any hydraulic setting cementitious material such as hydraulic cement which will impart rigidity to the board and will prevent expansion upon the absorption of water will be satisfactory as a substitute for the gypsum disclosed. In order to increase the rigidity and structural strength of the board and at the same time provide an improved surface for decoration, I prefer to secure to the gypsum layers cover sheets of paper or other membranes which may be waterproofed if desired. From the above description it will be seen that my invention contemplates an insulation board core having applied to the opposed faces thereof, and set in situ thereon, a layer of hydraulic setting cementitious composition, and if desired paper or similar cover sheets secured thereto, and preferably held by the cementitious composition.

In order that my invention may be more readily understood I will describe the same in connection with the accompanying drawing in which Figure 1 is a diagrammatic view of suitable mechanism to carry out the process of my invention;

Figure 2 is a plan view partially broken away illustrating my new insulation board;

Figure 3 is a sectional view taken on the line III—III of Figure 2;

Figure 4 is a plan view partially broken away illustrating a preferred type of core joint;

Figures 5 and 6 are plan views illustrating other core joints;

Figure 7 is a sectional view of a modified construction; and

Figure 8 is a sectional view of a further modification.

The mechanism used in carrying out my invention may be in the form of a modified gypsum board machine as diagrammatically shown in Figure 1. According to my preferred procedure, a lower cover sheet 2 is fed from a roll 3 over a supporting table 4 where a layer of hydraulic setting cementitious composition 5, such as gypsum, is applied thereto from a mass 6 placed on the sheet 2 in the path of a core 7 which is shown in the form of a web of fibrous insulation material. The sheet 2 may be chip board and is preferably wider than the final desired width of the finished product and is folded so as to cover the longitudinal edges of the board. If desired, the sheet 2 may be first scored at the lines 8 and 9 (Figure 3) to facilitate folding. Rotating grinding wheels 10 backed by a roll 11 (Figure 1) which are conventional elements in gypsum board machines may be used. The longitudinal edges of the lower cover sheet 2 are urged into a vertical position as indicated at 12 and serve to confine the gypsum which is squeezed out upon application of pressure to the core 7 by a pressure roll 13. By adjusting the position of the roll 13 with respect to the table 4, the thickness of the layer 5 may be varied since the layer 5 is spread by the pressure applied to the core 7 in its forward movement acting against the mass 6 which is also being urged forwardly by movement of a conveyor 14 carrying the cover sheet 2. It is preferred to feed the core material as a continuous web from the drying ovens employed in the manufacture of fiber boards of this type for by use of a continuous web of insulation the problems incident to joining the boards are obviated.

The board or web 7 is supported on rollers 15 to facilitate feeding and to permit the application of water, if desired, to the under side of the board. When a relatively thin layer of gypsum is used as the cementitious layer, it has been found desirable to moisten the board so as to prevent too rapid egress of moisture from the composition into the board whereby the bond is weakened and cracking often results. The water may be applied to the board by spray nozzles 16 attached to a suitable source of water supply. Spray booths 17 are employed to confine the spray, and the lower booth is preferably provided with a suitable drain 18 to carry away any excess water. It will be understood that certain cementitious compositions will not require premoistening of the surface and other compositions while requiring such moistening when employed in relatively thin layers will not require it if relatively thicker layers are applied.

The moistened sheet is fed forwardly with the lower cover sheet and a layer of cementitious composition 19 preferably similar to the composition 5 is applied to the exposed face of the core 7 from a mass 20 in a manner similar to the application of the layer 5. The vertically extending edges 12 of the lower cover sheet 2 are urged inwardly and downwardly by the guide 21 into the mass of gypsum 20 whereby a portion of the mass is applied to the top as well as to the under side of the inturned portion as is clearly illustrated in Figure 3 and the plastic composition 5' squeezed out upon the application of pressure to the core 7 is urged into engagement with the longitudinal edges of the core. The scoring 9 permits ready bending of the sheet 2 by the guide 21.

It will be noted by reference to Figure 3 that the lower cover sheet 2 encloses the under face as well as the longitudinal edges and a portion of the top face of the board and the edges 12 are embedded in the plastic composition 19 with the composition covering the portions 22 of the upper surfaces thereof and serving to secure the upper cover sheet 23 which is next applied.

Referring again to Figure 1, the cover sheet 23 which may be similar to the cover sheet 2 is fed from a roll 24 and the longitudinal edges thereof may be skived as at 25 (Figure 3) by means of grinding wheels 26 mounted for operation on the opposite longitudinal edges of the cover sheet and backed by a roll 27. By skiving these edges as shown, a relatively smooth upper surface is provided, which prevents the edges from being scuffed loose during transportation and handling. If desired the sheet 23 may be secured in position over the inturned edges 12 of the under cover sheet by means of a suitable adhesive applied adjacent the line of contact between the sheets. In practice it has been found that the gypsum which covers the portions 22 of the inturned edges 12 of the lower cover sheet 2 provides a satisfactory bond for the outer cover sheet, however. In order to further prevent disengagement of the two sheets in shipment and handling the upper cover sheet 23 is preferably of a width less than the width of the final board and provides marginal portions 28 on the opposite longitudinal edges of the board formed by the inturned lower cover sheet.

Various types of edge construction may be employed as desired. For example, the upper cover sheet may be folded to cover the longitudinal edges of the board in combination with the lower cover sheet. The various edge structures are well known by those skilled in the art.

The upper cover sheet may be urged into firm contact with the cementitious composition 19 by means of rollers 29 mounted on a suitable base 30 and the sheet thus formed fed forward into engagement with an oscillating smoothing plate 31 and cut into the desired lengths for drying by means of a flying guillotine knife 32 or other suitable cutting mechanism. The material then passes into a suitable drying oven and the cementitious composition is hydraulically set in situ on the fibers of the insulation board, whereby a mechanical as well as an adhesive bond is obtained.

In some instances it may be found desirable to form the core layer 7 of a plurality of individual pieces. It will be necessary when such procedure is carried out to carefully manipulate the material in the forming operation in order to obviate bulges at the line of juncture between the adjacent pieces of insulating board. The sheets may be cut at 90° with respect to the longitudinal edges of the board, but I prefer to cut the material on a bias as illustrated in Figure 4 in which the pieces have the form of a parallelepipedon with included angles of 120° and 60° on the large faces thereof. Other shapes may be employed if desired. When the sheet is cut to the desired size from the continuous length thus formed, the line of cutting being indicated by the dotted line 33, there will be no tendency for the portion 34 formed by the small remaining piece of insulation board to become broken away from the main body of the board which might be the case if joints extending at an angle 90° to the longitudinal direction of the board were made and the cut made closely adjacent a joint. It will be noted by reference to Figure 4 that the direction of the fibers with respect to the length of the board is at an angle thereto, whereby any expansion of the board upon the absorption of moisture is lateral of the board rather than longitudinal thereof and any tendency to deformation at the joints is eliminated. When the core is made up of a plurality of cut pieces of insulation material, it may be desirable to slightly modify the apparatus to feed these pieces in the desired manner.

If desired, the core may be formed of pieces with longitudinal and transverse joints as illustrated in Figure 5. The transverse joints are preferably staggered as illustrated at 35 and 36 in order that there will be no weakened portion transversely of the entire width of the board. The number of pieces required for a given width may be varied as desired. In Figure 5 each piece is equivalent to one-half of the desired width.

In Figure 6 a still further modification of joint construction is illustrated in which one transverse edge has a salient angle 37 and the other edge has a reentrant angle 38 whereby adjacent pieces interengage. By this construction it is possible to accurately center the core portions one with respect to the other because the salient angular portion 37 terminates in a point which is guided into position by the reentrant portion 38, whereby transverse movement of the core member is controlled. As stated above, various modifications may be employed in the joint construction. The desired end is to provide a joint construction which will not form a bulge on the exterior of the finished board and also to provide a board which when cut adjacent a joint will not leave a small portion which is not securely attached to the remainder of the board.

In the previous embodiments described, the longitudinal edges as well as the faces of the board have been sheathed in a cementitious composition and covered with paper. It will be understood that my invention is not so limited but also contemplates a fibrous core having applied to the opposite faces only a layer of hydraulic setting cementitious composition which is mechanically and adhesively secured to the board and cover sheets applied to the composition, and as illustrated in Figure 7, the core 7 may be provided with square cut edges free of gypsum and paper coverings. This type of board has been found highly desirable for certain uses and expansion upon absorption of moisture is negligible.

It will be further evident from an examination of Figure 8 that the fibrous core 7 may be provided with layers of gypsum 5 and 19 and paper cover sheets 2 and 23 as in the other embodiments and a rabbet 39 and a corresponding tongue 40 formed therein and adapted for interengagement to form a tight joint. This board is also shown with recesses 41 and 42 in the form of shallow grooves which serve to hold plaster which may be subsequently applied thereto. In other words, the embodiment of Figure 8 is a form of insulation lath which may conveniently be made from my insulation board.

To compare the product of my invention with the typical example of fibrous insulation material previously described herein, a board of my invention having a ⅜" core of fibrous insulation with a density of 1.1 pounds, 1/16" layers of gypsum and chip board cover sheets, has the following characteristics: Weight 2.36 pounds per square foot one inch thick; conductivity of ($K_{90}$) .37 B. t. u. per hour per degree temperature change per inch of thickness; modulus of rupture of approximately 900 pounds per square inch; a deflection of .01 inch when tested in accordance with the Federal specifications, described in connection with the fiber board; water absorption equivalent to 16 per cent by volume and linear expansion upon such water absorption of not more than one tenth of one per cent; on many tests no measurable expansion was had. From this it will be seen by comparison with the physical characteristics outlined for fiber board that while the weight per board foot has increased slightly, the conductivity is substantially the same, the modulus of rupture has been doubled even though the density of the core is considerably lower, the deflection is one-fifth of that of fiber board, the water absorption, while higher due to the addition of water absorbing paper cover sheets, has not caused any appreciable linear expansion in the board, and water absorption from the faces which form the major surface area of the board has been eliminated. The chip board absorbs considerable moisture upon immersion, and for certain uses waterproof cover sheets may be desirable, such for example as asphalt impregnated felt sheets.

The layers of hydraulic setting cementitious composition applied to the core are probably responsible for preventing shrinkage and the confining action is undoubtedly greatly enhanced by reason of the mechanical bond obtained by the interlocking of the fibers of the board with the composition upon setting. I do not wish to be limited by the theory thus expressed, but, in any event, the board possesses the unusual property of not expanding upon the absorption of relatively large amounts of moisture.

While my board is slightly more expensive to manufacturer than the fibrous insulation boards now on the market, the physical characteristics imparted by my treatment and present in my product open a new channel of use for insulation wall boards not heretofore available because of the inherent deficiencies of the fibrous insulation boards and gypsum wall boards of commerce.

While I have described and illustrated the preferred embodiment of my invention, it will be understood that the invention is not so limited but may be otherwise embodied within the scope of the following claims.

I claim:

1. An insulation board comprising a core of fibrous insulation board having open porous faces and susceptible to expansion upon absorption of moisture, layers of gypsum formed in situ on the faces thereof and reenforcing cover sheets bonded to said gypsum layers upon setting thereof, said gypsum layers restricting expansion of said core upon the absorption of moisture.

2. An insulation board comprising a core of fibrous insulation board, susceptible to expansion upon absorption of moisture, relatively thin layers of hydraulic setting, fire resistant cementitious material formed in situ on the faces of said core, mechanically and adhesively secured thereto and restricting expansion of said core upon absorption of moisture, and cover sheets bonded to the layers of cementitious material upon setting thereof.

3. An insulation board comprising a core of fibrous insulation board, susceptible to expansion upon absorption of moisture, relatively thin layers of gypsum formed in situ on the faces thereof, and reenforcing paper sheets bonded to said gypsum layers upon setting thereof, said gypsum layers restricting expansion of said core upon the absorption of moisture.

4. An insulation board comprising a core of structural heat insulation board of an open, porous character capable of absorbing and holding moisture and susceptible to expansion upon such absorption, a casing in the form of a relatively thin layer of gypsum applied to the faces and longitudinal edges of the core and set thereon, and reenforcing cover sheets applied to said gypsum and secured thereto by setting of said gypsum, said gypsum stiffening said core and restricting expansion of said core upon the absorption of moisture.

5. An insulation board comprising a core of fibrous, structural heat insulation board of an open, porous character, susceptible to expansion upon absorption of moisture, a sheathing of gypsum applied to the faces and longitudinal edges of said core and set thereon whereby said core is mechanically and adhesively held in position, and reenforcing cover sheets of paper applied to said gypsum and secured thereto upon setting thereof, said sheathing restricting expansion of said core upon the absorption of moisture.

6. An insulation board comprising a core formed of a plurality of structural, fibrous insulation elements, lying in juxtaposition with two edges thereof parallel to the length of said board and with their transverse edges extending generally at an angle other than 90° with respect to the length of said board, relatively thin layers of hydraulic setting, fire resistant cementitious material formed in situ on the faces of said core elements, said layers restricting expansion of said elements upon absorption of moisture, and cover sheets secured to said layers upon setting thereof and reenforcing the board.

7. An insulation board comprising a core formed of a plurality of structural, fibrous insulation elements having transverse and longitudinal joints, one transverse joint being offset longitudinally with respect to another transverse joint, a sheathing of hydraulic setting cementitious material formed in situ on said elements, said layers restricting expansion of said elements upon absorption of moisture, and cover sheets secured to said layers upon setting thereof and reenforcing the board.

8. An insulation board comprising a core of low density, fibrous insulation board, susceptible to expansion upon absorption of moisture, a sheathing of hydraulic setting cementitious material applied and bonded thereto by setting in situ thereon and asphalt saturated fibrous cover sheets secured to said sheathing upon setting thereof, said sheathing restricting expansion of said core upon the absorption of moisture.

9. As a new article of manufacture, a plaster lath in the form of a board like element having complementary interengaging means on the longitudinal edges thereof, and provided with a plaster securing groove, said element comprising a core of fibrous insulation board, susceptible to expansion upon absorption of moisture, layers of hydraulic setting cementitious material applied to at least the faces thereof and bonded thereto by setting in situ thereon, and paper cover sheets secured to said cementitious layer upon setting thereof, said cementitious layers restricting expansion of said core upon the absorption of moisture and said paper sheets reenforcing said cementitious layer.

10. In the method of making insulation boards, the steps consisting in advancing a web of covering material, applying a layer of hydraulic setting cementitious composition to said web, applying fibrous insulation board to said composition prior to setting thereof, applying a layer of hydraulic setting cementitious composition to the exposed face of said insulation, applying a cover sheet to said last-named layer and forming rigid fire resistant composition layers in situ on said insulation by setting said hydraulic setting composition.

11. In the method of making insulation boards, the steps consisting in advancing a web of paper covering material, applying a relatively thin layer of gypsum to said web, applying fibrous insulation board which has been pre-moistened to said composition prior to setting thereof, applying a relatively thin layer of gypsum to the exposed face of said insulation, applying a paper cover sheet to said last-named layer and forming a fire resistant, rigid insulation board by setting said composition layers while in adhesive engagement with the paper cover sheets and the insulation board.

12. In the method of making insulation boards, the steps consisting in advancing a web of covering material having a width greater than the width of the final desired product and sufficient to cover one face, the longitudinal edges and at least a portion of the opposite face of the finished product, applying a mass of hydraulic setting cementitious composition to said web, advancing a web of porous, fibrous, heat insulation board which is self-sustaining and moisture absorbent into engagement with said mass, applying pressure to said insulation to distribute said composition over said web in a layer, applying a second mass of hydraulic setting cementitious composition to the exposed face of said insulation board, urging the longitudinal edges of said web of covering material into said second mass of composition whereby the longitudinal edges of said web of covering material are embedded therein, advancing a cover sheet into engagement with said mass, applying pressure to said cover sheet to distribute said composition over said insulation in a layer, and forming a rigid, protecting sheath in situ on said insulation by setting said composition layers on said insulation.

13. In the method of making insulation boards, the steps consisting in advancing a sheet of covering material, applying a layer of hydraulic setting cementitious composition to said web, applying pieces of porous, heat insulation board to said composition prior to setting thereof with the longitudinal edges of said insulation extending parallel to the edges of said web and the transverse edges extending at an angle other than 90° with respect thereto, applying a layer of hydraulic setting cementitious composition to the exposed face of said insulation, applying a sheet of covering material to said last-named layer and setting said composition layers while in adhesive engagement with said insulation and said sheets.

14. In the method of making insulation boards, the steps consisting in advancing a web of covering material, applying a layer of gypsum to said web, applying fibrous insulation board to said composition prior to setting thereof, applying a layer of gypsum to the exposed face of said insulation, applying a cover sheet to said last-named layer, setting said gypsum while in adhesive engagement with said insulation and said cover sheets, and thereafter contouring said board to the desired final shape.

15. In the method of making rigid fire resistant insulation units, the steps consisting in advancing a cover sheet, applying a layer of hydraulic setting cementitious composition to said sheet, applying moisture to the faces of a sheet of fibrous, heat insulation material in board form, urging said sheet in engagement with said composition, applying a layer of hydraulic setting cementitious composition to the exposed face of said insulation, applying a cover sheet to said last-named layer, setting said composition layers while in engagement with the insulation and the cover sheets and cutting the integral structure so formed into desired shapes.

16. An insulation board comprising a core formed of a plurality of structural, heat insulation elements of self-sustaining character lying in juxtaposition with two edges thereof parallel to the length of the board and with their transverse edges extending generally at an angle other than 90° with respect to the length of the board, a relatively thin sheathing of gypsum encasing said boards on the flat faces and longitudinal edges at least thereof and restricting expansion of said elements upon absorption of moisture, and a fibrous membrane covering said gypsum sheathing and reenforcing the same, said gypsum sheathing securing the elements as a unit by setting while in contact therewith.

STEPHEN J. KELLEY.